(12) United States Patent
Flik et al.

(10) Patent No.: US 9,222,841 B2
(45) Date of Patent: Dec. 29, 2015

(54) METHOD FOR OPERATING AN INTERNAL COMBUSTION ENGINE

(75) Inventors: Gottfried Flik, Leonberg (DE); Christian Fuchs, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 939 days.

(21) Appl. No.: 13/165,414

(22) Filed: Jun. 21, 2011

(65) Prior Publication Data

US 2011/0315115 A1 Dec. 29, 2011

(30) Foreign Application Priority Data

Jun. 23, 2010 (DE) .................. 10 2010 030 404

(51) Int. Cl.
| F02D 41/00 | (2006.01) |
| G01K 1/14 | (2006.01) |
| F02D 35/02 | (2006.01) |
| F02D 41/30 | (2006.01) |
| G01L 19/00 | (2006.01) |
| G01L 23/10 | (2006.01) |

(52) U.S. Cl.
CPC .............. G01K 1/14 (2013.01); F02D 35/023 (2013.01); F02D 35/025 (2013.01); F02D 41/0072 (2013.01); F02D 41/3035 (2013.01); G01L 19/0092 (2013.01); G01L 23/10 (2013.01); G01K 2205/00 (2013.01); Y02T 10/47 (2013.01)

(58) Field of Classification Search
CPC ............ F02D 41/1438; F02D 41/1439; F02D 41/1444; F02D 41/1446; F02D 41/1447; F02D 41/0072; F02D 35/025; F02D 35/026; F02D 35/023

USPC .......... 123/672, 435, 568.11, 568.14, 568.16, 123/568.21, 703; 701/101–102, 108–109, 701/115; 73/114.16, 114.17, 114.18, 73/114.69, 114.7, 114.71, 114.72, 114.73, 73/114.74, 714

See application file for complete search history.

(56) References Cited

U.S. PATENT DOCUMENTS

| 4,621,603 | A | * | 11/1986 | Matekunas | ................... | 123/435 |
| 4,913,118 | A | * | 4/1990 | Watanabe | ..................... | 123/435 |
| 5,228,333 | A | * | 7/1993 | Kleinschmidt et al. | .... | 73/114.18 |
| 5,419,296 | A | * | 5/1995 | Yamaura | ........................ | 123/435 |
| 6,840,235 | B2 | * | 1/2005 | Koseki et al. | ............ | 123/568.14 |
| 7,281,368 | B2 | * | 10/2007 | Miyake et al. | .................. | 60/285 |
| 7,367,310 | B2 | * | 5/2008 | Kakuya et al. | ................ | 123/295 |
| 7,475,673 | B1 | * | 1/2009 | Fattic | ............................. | 123/435 |
| 7,542,841 | B2 | * | 6/2009 | Yahia et al. | ................... | 701/103 |
| 7,628,145 | B2 | * | 12/2009 | Ishibashi et al. | ......... | 123/568.11 |
| 7,673,503 | B2 | * | 3/2010 | Emery et al. | ............... | 73/114.17 |

(Continued)

FOREIGN PATENT DOCUMENTS

| CN | 1450257 | 10/2003 |
| CN | 1519467 | 8/2004 |

(Continued)

*Primary Examiner* — Thomas Moulis
(74) *Attorney, Agent, or Firm* — Kenyon & Kenyon LLP

(57) ABSTRACT

A method for operating an internal combustion engine is described. At least one composition of a gas mixture is determined in at least one combustion chamber of the internal combustion engine. At least one combustion chamber pressure is detected in the interior of the combustion chamber and at least one local combustion chamber temperature is detected in the interior of the combustion chamber. The composition is inferred from the combustion chamber pressure and the combustion chamber temperature.

11 Claims, 3 Drawing Sheets

(56) References Cited

U.S. PATENT DOCUMENTS

| | | | |
|---|---|---|---|
| 7,715,973 B2* | 5/2010 | Erol ............................... 701/102 |
| 7,822,529 B2* | 10/2010 | Dagci et al. ................... 701/102 |
| 7,861,690 B2* | 1/2011 | Moriya et al. ............ 123/406.41 |
| 7,920,956 B2* | 4/2011 | Hillion et al. ................. 701/103 |
| 8,055,432 B2* | 11/2011 | Sun et al. ...................... 701/103 |
| 8,210,158 B2* | 7/2012 | Kang et al. ............... 123/568.19 |
| 8,265,851 B2* | 9/2012 | Girouard et al. ................ 701/99 |
| 8,434,456 B2* | 5/2013 | Fischer et al. ................. 123/435 |
| 2005/0229903 A1* | 10/2005 | Kobayashi et al. ............ 123/435 |
| 2006/0137655 A1 | 6/2006 | Dordet |
| 2007/0245818 A1* | 10/2007 | Matekunas et al. .......... 73/118.1 |
| 2007/0261671 A1* | 11/2007 | Nakagawa et al. ............ 123/435 |
| 2008/0264382 A1* | 10/2008 | Kang .............................. 123/435 |
| 2009/0025468 A1 | 1/2009 | Flik et al. |
| 2009/0151696 A1* | 6/2009 | Graupner et al. .............. 123/435 |
| 2009/0223485 A1* | 9/2009 | Hamedovic et al. .......... 123/435 |
| 2009/0235728 A1* | 9/2009 | Sinnamon ................. 73/118.02 |
| 2009/0281708 A1* | 11/2009 | Loeffler et al. ................ 701/103 |
| 2009/0299612 A1* | 12/2009 | Truscott et al. ................ 701/108 |
| 2009/0306875 A1* | 12/2009 | Jiang et al. ..................... 701/102 |
| 2010/0131173 A1* | 5/2010 | Willi et al. ..................... 701/103 |
| 2010/0300186 A1 | 12/2010 | Kern et al. |
| 2011/0120416 A1* | 5/2011 | Lamping et al. .............. 123/445 |
| 2011/0132332 A1* | 6/2011 | Caretta et al. ................. 123/486 |

FOREIGN PATENT DOCUMENTS

| | | |
|---|---|---|
| CN | 1853037 A | 10/2006 |
| CN | 1918378 A | 2/2007 |
| CN | 101182809 A | 5/2008 |
| CN | 101275044 | 2/2009 |
| CN | 101370681 A | 2/2009 |
| DE | 102004047143 | 4/2006 |
| DE | 102006049079 | 4/2008 |
| JP | 2007-101549 | 4/2007 |

* cited by examiner

METHOD FOR OPERATING AN INTERNAL COMBUSTION ENGINE

CROSS REFERENCE

The present application claims the benefit under 35 U.S.C. §119 of German Patent Application No. DE 102010030404.2 filed on Jun. 23, 2010, which is expressly incorporated herein by reference in its entirety.

BACKGROUND INFORMATION

Future developments for internal combustion engines are determined by various statutory requirements to reduce pollutant emissions and fuel consumption at the same time. One approach in this regard is the so-called homogeneous charge compression ignition (HCCI), which has been investigated extensively in recent times. In general, such homogeneous combustion processes implement concepts in which combustion of a homogeneous fuel/air mixture begins simultaneously throughout the entire combustion chamber. Such concepts exist for both gasoline engines (controlled auto ignition, CAI) and diesel engines (homogeneous charge late ignition, HCLI). However, it is characteristic of such methods as well as other low-emission combustion processes that the features of combustion are used as regulating variables, i.e., that a combustion regulation is carried out. The implementation of such methods thus necessitates the use of one or more combustion chamber sensors. The combustion chamber pressure sensor, i.e., cylinder pressure sensor, may be regarded as the state of the art here.

German Patent Application No. DE 10 2004 047 143 A1 describes a piezoelectric combustion chamber pressure sensor having a pressure-transmitting pin. A sensor element of a single-crystalline piezoelectric material is described therein for measuring the pressure in a combustion chamber of an internal combustion engine using a pressure-transmitting pin, a glow plug, which is displaceably mounted and protrudes into the combustion chamber, being provided as the pressure-transmitting pin. German Patent Application No. DE 10 2006 049 079 A1 describes a pressure measuring device for placement in a chamber of an internal combustion engine, having a housing, a force-transmitting element and a pressure sensor.

The cylinder pressure or the combustion chamber pressure in general is fundamentally a useful variable because it allows the calculation of a heating characteristic analysis, thus making characteristic variables of combustion, for example, the start of combustion, the location of combustion, or similar characteristic variables available for regulation. These variables are mostly used as a basis, in particular as regulating variables, of the aforementioned applications for gasoline and diesel engines. The manipulated variables of combustion regulation usually include exhaust gas recirculation rate (EGR), injection time and injection quantity. The exhaust gas recirculation rate is a characteristic variable in exhaust gas recirculation, which is used to reduce nitrogen oxides in gasoline engines, diesel engines or even in other internal combustion engines. Temperature peaks are lowered by exhaust gas recirculation. However, with the conventional manipulated variables, the exhaust gas recirculation rate plays a special role because changes in that rate do not have a direct effect on combustion due to the mixing in the intake area of the engine. During dynamic engine operation in particular, an effective exhaust gas recirculation rate cannot be given. However, cylinder pressure sensors are also of interest for conventional combustion processes in conjunction with cylinder-specific diagnostic functions. It would be desirable in general to have devices and methods which could be used in both gasoline engines and diesel engines and which permit operation of an internal combustion engine reliably and efficiently, in particular an internal combustion engine having direct injection and exhaust gas recirculation. The devices and methods should in particular provide an indicator for an efficient exhaust gas recirculation rate or an alternative indicator for an exhaust gas recirculation.

SUMMARY

In accordance with the present invention, an example method for operating an internal combustion engine is provided along with a combination sensor for detecting a combustion chamber pressure and a combustion chamber temperature. In accordance with the present invention, an example method is provided for simultaneous measurement of pressure and a local temperature in the combustion chamber and thus develop an indicator for a mass-based gas composition. Modern engines in the future will likely have both direct injection and exhaust gas recirculation in the field of both gasoline and diesel engines. However, this means that the intake gas is compressed without the addition of fuel before the actual introduction of fuel. In accordance with the present invention, the mass-based composition of gases in the range of the volumes of the internal combustion engine is a decisive characteristic variable. This mass-based composition $\beta$ may be described by the ratio $$\beta = \frac{m^{combust}}{m^{combust} + m^{air}} \quad (1)$$

Mass-based composition $\beta$ here describes the mass-based ratio of combusted air ($m^{combust}$) and fresh air ($m^{air}$) in a volume in question. Combusted air is the product of stoichiometric combustion of fresh air and fuel. Combusted air and fresh air are thus to be regarded as constant with regard to the composition if the variable atmospheric humidity is disregarded. The compression phase may be described using the following physical equations:

$$\kappa = \frac{c_p}{c_V} = \kappa(\beta, T) \quad (2)$$

and $$pV^\kappa = p_0 V_0^\kappa. \quad (3)$$

where $\kappa$ describes the isentropic coefficient (also known as the isentropic exponent) of the gas mixture, i.e., the ratio of specific thermal capacity $c_p$ at a constant pressure and specific thermal capacity $c_v$ at a constant volume. This isentropic coefficient $\kappa$ is a function of mass-based composition $\beta$ and temperature T. Variables p and V refer to the pressure and volume, and corresponding variables $p_0$ and $V_0$ refer to the pressure and volume under normal conditions.

In accordance with the example method, the combustion chamber pressure and the temperature in the interior of the combustion chamber are detected. The combustion chamber pressure may be detected, for example, with the aid of at least one combustion chamber pressure sensor, in particular as a global variable. This is due to the fact that the pressure in the combustion chamber propagates practically at the speed of sound, so that pressure in the combustion chamber may be regarded as a global variable. By using equation (3), isentropic coefficient κ may be determined from the measurement of the pressure. Based on the measurement of a local combustion chamber temperature T, the initially local value of β may be determined on that basis with the aid of equation (2). If it is also assumed that there is complete and thorough mixing of recirculated exhaust gas and fresh air for the filling of a cylinder or a combustion chamber as a result of the intake process and that similar thoughts also apply to the area of an exhaust gas manifold, the result is that the β determined in this way is a global variable. Thus, on the whole, the gas composition in the entire combustion chamber is preferably determined in this way.

With the example method for operating an internal combustion engine, at least one composition of a gas mixture in at least one combustion chamber of the internal combustion engine is determined accordingly. At least one combustion chamber pressure p in the interior of the combustion chamber is detected and at least one local combustion chamber temperature in the interior of the combustion chamber is detected, so that the composition is inferred from the combustion chamber pressure and the combustion chamber temperature. As described above, the combustion chamber pressure and the combustion chamber temperature may be detected essentially simultaneously in particular. Essentially simultaneous detection is understood to refer to detection on a time scale which allows minor deviations from simultaneity in comparison with a cycle duration. For example, deviations smaller than one tenth, preferably smaller than one hundredth of a cycle duration of a combustion cycle may be tolerated. Combustion chamber pressure p and combustion chamber temperature T may be detected in particular in a compression phase of the internal combustion engine, preferably before the start of combustion.

Generally any characteristic value which characterizes the composition of the gas mixture in the combustion chamber may be used for the composition. In particular, various components and their proportions in the gas mixture may be related to one another or to the total gas mixture. Masses, volumes, partial pressures, concentrations, percentage amounts or similar amounts may be used. It is particularly preferred if the composition includes a mass-based ratio β of combusted air and fresh air, as explained above, according to equation (1) above. Alternatively or additionally, however, other characteristic variables may also be ascertained to characterize the composition.

As explained above, it is preferable in particular if an isentropic coefficient κ of the gas mixture is determined from the detected combustion chamber pressure, for example, by using known volume V. This may take place according to equation (3) above, for example, by solving this equation (3) for κ. In particular, the composition may be inferred from a known correlation between the isentropic coefficient, the combustion chamber pressure and the combustion chamber temperature. This may be accomplished, for example, by solving equation (2) above for composition β or another variable characterizing the composition. This procedure may be performed analytically, empirically or even semi-empirically. For example, known correlations among the combustion chamber temperature, the combustion chamber pressure and the isentropic coefficient and the composition may be used, for example, in that such correlations are known, for example, in the form of curves, sets of curves, analytical equations or tables (for example, electronic tables, lookup tables). Such correlations may be stored in a memory element and/or in a data processing device, for example.

As described above, the internal combustion engine may preferably be an internal combustion engine operated by a homogeneous combustion process (for example, CAI, HCLI or a similar homogeneous combustion process). In particular it may be an internal combustion engine having direct injection and preferably exhaust gas recirculation. For example, as described above, it may be an HCCI internal combustion engine, for example, a CAI internal combustion engine or an HCLI internal combustion engine in a motor vehicle in particular. Taking into account the thoughts mentioned above, i.e., under various assumptions (for example, the assumption of complete and thorough mixing of the recirculated exhaust gas and fresh air and the assumption that β is a global variable) and/or under other similar assumptions, the present invention permits in particular a determination of a chemical composition of the air/exhaust gas mixture in the combustion chamber before the start of combustion. Using conventional mathematical models to determine the gas mass in the combustion chamber after closing an intake valve makes it possible to determine the gas composition in the combustion chamber, which is relevant for the combustion. This method may be performed in particular by using mass-based ratio β of combusted air and fresh air as a regulating variable (optionally as one of several regulating variables) for regulating the internal combustion engine, in particular in the case of homogeneously operated gasoline engines (CAI) and/or diesel engines (HCLI). This may be accomplished, for example, with the aid of a corresponding control unit and a corresponding function of the control unit. In particular the regulating variable of the exhaust gas recirculation rate, which has been used in the past, may be replaced completely or partially by mass-based ratio β. This generally allows the introduction of a working cycle-based manipulated variable and is comparable to an injection time and an injection quantity. In addition, in particular for conventionally operated internal combustion engines (i.e., nonhomogeneously operated internal combustion engines), the composition of the gas mixture in the combustion chambers may be determined before combustion.

In addition, mass-based ratio β of combusted air and fresh air may also be utilized to determine one or more additional characteristic variables. The method may thus generally be performed in such a way that additionally at least one air ratio and/or optionally at least one humidity of intake air of the internal combustion engine is/are determined. This method may be performed in such a way that the exhaust gas recirculation rate is determined from the composition of the gas mixture with a simultaneous measurement of air ratio λ, in particular for steady-state operations. Determination of the exhaust gas recirculation rate may be further improved with simultaneous measurement of air ratio λ and the humidity of the fresh air taken in. This method may thus be performed in general in such a way that the internal combustion engine is operated with exhaust gas recirculation, an exhaust gas recirculation rate being inferred from the composition and the air ratio as well as optionally the humidity, in particular in steady-state operation of the internal combustion engine.

Furthermore, the internal combustion engine may have several combustion chambers, so that compositions in several combustion chambers may be determined simultaneously or with a time offset. With the aid of the example method described above, it is possible in particular to directly quantify under certain circumstances the unequal distribution of recycled exhaust gas into the combustion chambers, for example, the cylinders, and to perform cylinder-specific countermeasures by varying the injection times and injection quantities. Accordingly, optionally, the example method may be carried out in such a way that homogeneity of the compositions in the combustion chambers is detected, control of the internal combustion engine operationally being influenced by the detected homogeneity, in particular by influencing an exhaust gas recirculation, for example, through a corresponding control and/or regulation of the exhaust gas recirculation. Furthermore, from the characteristic of the combustion chamber temperature, for example, the cylinder temperature, it is possible to derive features of the characteristic curve of the combustion chamber pressure, for example, the cylinder pressure, during an operating cycle. Comparing a prediction with a characteristic actually measured allows a diagnosis of the combustion chamber pressure sensor or a combination of the two sensors.

In another aspect of the present invention, a combination sensor is provided for detecting a combustion chamber pressure and a combustion chamber temperature in the interior of a combustion chamber of an internal combustion engine, in particular in a cylinder. The combination sensor is suitable for being used in a method according to the present invention in particular. However, the combination sensor may also generally be used for other purposes. The combination sensor may be attached to a wall of the combustion chamber, in particular in a cylinder head. This attachment may be detachable, for example, by a force-fit and/or form-fit attachment, but other types of attachment, such as form-fit attachments, are also possible. A screw attachment may also be provided. For this purpose, the combination sensor may include, for example, at least one thread, e.g., an outside thread, with the aid of which the combination sensor is screwable into a borehole having an inside thread in a combustion chamber wall. However, other types of attachment are also possible alternatively or additionally.

The combination sensor has at least one combustion chamber pressure sensor. The combustion chamber pressure sensor includes at least one mechanical-electrical converter. A mechanical-electrical converter is understood in general to be a converter element, which is capable of converting mechanical actions, for example, pressures and/or forces, into electrical signals, for example, charges and/or voltages and/or currents. This mechanical-electrical converter may be in particular a piezoelectric element and/or a piezoceramic. However, other mechanical-electrical converters are fundamentally also possible. The combustion chamber pressure sensor also includes at least one force-transmitting element for transmitting the combustion chamber pressure to the mechanical-electrical converter. This force-transmitting element may fundamentally include one or more rigid bodies of any type, which are equipped to pick up at one end a force due to the combustion chamber pressure or the combustion chamber pressure itself directly or indirectly, for example, and to transmit this force or this pressure to the mechanical-electrical converter. The force-transmitting element may have a cylindrical shape, for example, in the form of a rod and/or cylinder sleeve. In particular the force-transmitting element may have insulating properties, for example, by designing it entirely or partially as an insulating body, for example, as an insulating body made of a ceramic material.

The combination sensor also has at least one temperature sensor. This temperature sensor may be in general at least one element, which is equipped to detect a signal according to the temperature of the combustion chamber. In general, any conventional temperature sensor may be considered here. In particular temperature sensing resistors such as PTCs and/or NTCs may be used here. However, it is particularly preferred if, alternatively or additionally, the temperature sensor includes at least one thermocouple or is designed as a thermocouple, i.e., as an element which is able to detect temperatures on the basis of the Seebeck effect. It is generally proposed here that the temperature sensor be guided through the combustion chamber pressure sensor into the combustion chamber. This may be accomplished, for example, by guiding the temperature sensor centrally through a pressure sensor module of the combustion chamber pressure sensor. However, other embodiments are also possible, for example, non-coaxial embodiments. The temperature sensor may be sealed with respect to the combustion chamber pressure sensor, in particular to prevent gases from penetrating into the combustion chamber pressure sensor, for example, the pressure sensor module.

The combustion chamber pressure sensor may generally include a pressure sensor module. A pressure sensor module is understood to be a generally sealed unit which performs the functions of the combustion chamber pressure sensor. In addition to the pressure sensor module, however, other elements may also be provided in the combustion chamber pressure sensor, for example, one or more force-transmitting elements, as described above. The mechanical-electrical converter is accommodated in the pressure sensor module. The pressure sensor module may have its own module housing, for example, which may be partially or completely closed. In addition to the mechanical-electrical converter, additional elements may also be accommodated in the pressure sensor module. For example, at least one force-transmitting element, for example, a ceramic isolator body, and/or another type of force-transmitting element may be accommodated on the side facing the combustion chamber. For example, a counterbearing may be accommodated on the opposite side of the mechanical-electrical converter element, and also an insulating body, for example. Moreover, alternatively or additionally, the counterbearing may be a metallic counterbearing, for example, a steel plate. On the side facing the combustion chamber, the pressure sensor module may be sealed by at least one diaphragm in particular. A diaphragm is understood to be a flat structure which is deformable under pressure, for example, a film and/or a thin plate. The diaphragm may be a steel diaphragm in particular. The pressure sensor module may be sealed with respect to the combustion chamber with the aid of the at least one diaphragm.

As described above, the temperature sensor may in particular be guided coaxially through the combustion chamber pressure sensor, in particular through the pressure sensor module. Thus, for example, on the side of the pressure sensor module facing away from the combustion chamber, the temperature sensor may have a terminal which is accessible from the outside. The temperature sensor may protrude beyond the pressure sensor module on the side facing the combustion chamber and in particular may protrude beyond the wall of the combustion chamber into the combustion chamber. The combination sensor preferably has a generally axially symmetrical design. The temperature sensor may be guided through the diaphragm in particular. This lead-through may be sealed in particular. For example, the temperature sensor may be welded to the diaphragm or otherwise integrally joined with the diaphragm, so that, for example, gases from the combustion chamber cannot reach the interior of the pressure sensor module. The temperature sensor may be guided between the combustion chamber pressure sensor, for example, the pressure sensor module and the combustion chamber in at least one guide. This guide may include in particular at least one hollow cylinder, for example, a hollow cylinder made of steel. However, other embodiments are also possible.

As described above, the combination sensor may be attached in the wall of the combustion chamber. This attachment may be sealed in particular. The combination sensor may in particular have a stepped design, for example, an axially symmetrical stepped design, in which at least one end facing the combustion chamber may have a smaller diameter than the end facing away from the combustion chamber. In particular, the stepped design may have at least one sealing shoulder, i.e., a transition between a cylindrical section of a larger diameter and a cylindrical section of a smaller diameter. A seal with respect to the wall of the combustion chamber may be created on this sealing shoulder. This may be accomplished, for example, by pressing the sealing shoulder against a corresponding shoulder in a borehole in the wall of the combustion chamber by a screw connection or some other type of attachment. In general, the combination sensor may be designed, for example, in such a way that the combustion chamber pressure sensor is situated within the wall of the combustion chamber, for example, by placing the pressure sensor module in this area, so that forces and/or pressures from the combustion chamber are transferred by the at least one force-transmitting element to the mechanical-electrical converter. The temperature sensor may in turn protrude into the combustion chamber. However, other embodiments are also possible.

BRIEF DESCRIPTION OF THE DRAWINGS

Exemplary embodiments of the present invention are shown in the figures and are explained in greater detail below.

DETAILED DESCRIPTION OF EXAMPLE EMBODIMENTS

Figure 1:
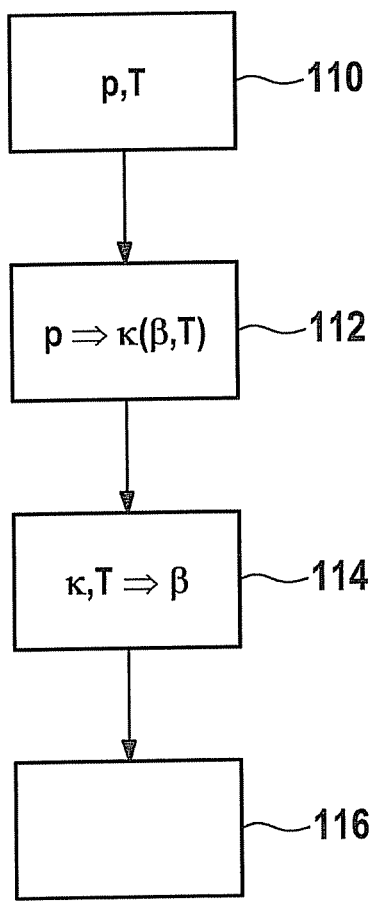
FIG. 1 shows a schematic flow chart of an exemplary embodiment of a method according to the present invention.

FIG. 1 shows a schematic flow chart of an exemplary embodiment of a method according to the present invention. In a first method step (reference numeral 110 in FIG. 1), combustion chamber pressure p and temperature T are detected. In a second method step (reference numeral 112), isentropic coefficient κ, also known as the isentropic exponent, is determined from the combustion chamber pressure, for example, using equation (3) given above. In another method step (reference numeral 114), variable β is inferred from a known relationship between the isentropic coefficient, combustion chamber temperature T and composition β, in particular a mass-based ratio β according to equation (1) above. Composition β as well as optionally other regulating variables may then be used in a method step 116 for an engine controller, which may also include regulation for the purpose of determining and/or regulating an exhaust gas recirculation rate, for example.

For the example method depicted in FIG. 1 as well as other methods according to the present invention, it is necessary to know combustion chamber pressure p and the combustion chamber temperature. Conventional combustion chamber pressure sensors are described in, for example, German Patent Application No. DE 10 2004 047 143 A1 or from German Patent application No. DE 10 2006 049 079 A1. For example, German Patent application No. DE 10 2004 047 143 A1 describes a combustion chamber pressure sensor having an integrated glow plug using a pressure-transmitting pin. The measurement method described there, which may also be used within the scope of the present invention to determine the combustion chamber pressure, involves an indirect pressure measurement because the measured variable of the combustion chamber pressure is converted into a combustion chamber pressure-dependent force with the aid of a transmission element, for example, a steel diaphragm, and conveyed to a force measuring cell. The force measuring cell may be designed to be cylindrical, for example, so that a current supply may be provided centrally to the glow body.

Figure 2:
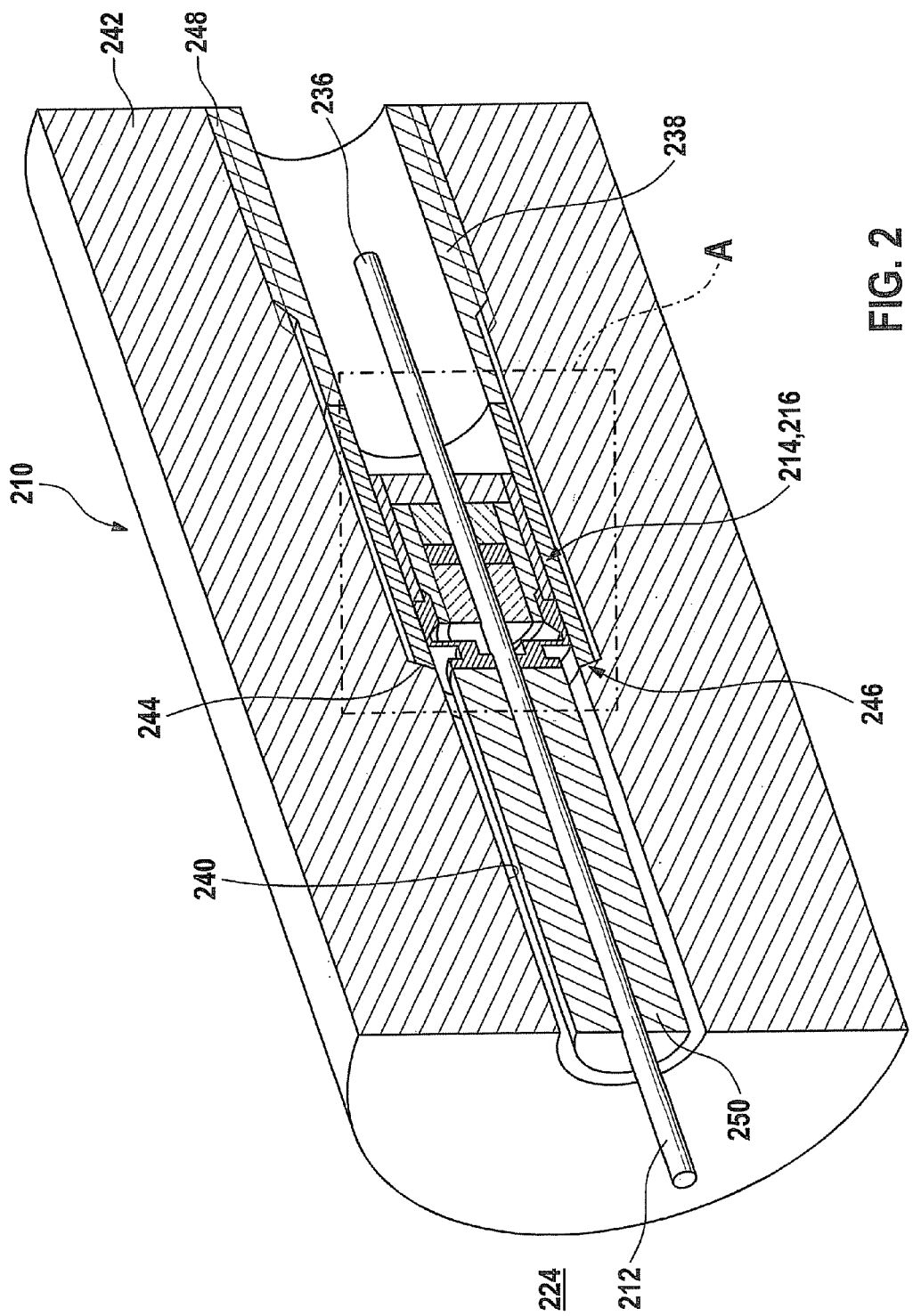
FIGS. 2 and 3 show various diagrams of an exemplary embodiment of a combination sensor according to the present invention in a perspective sectional diagram.
Figure 3:
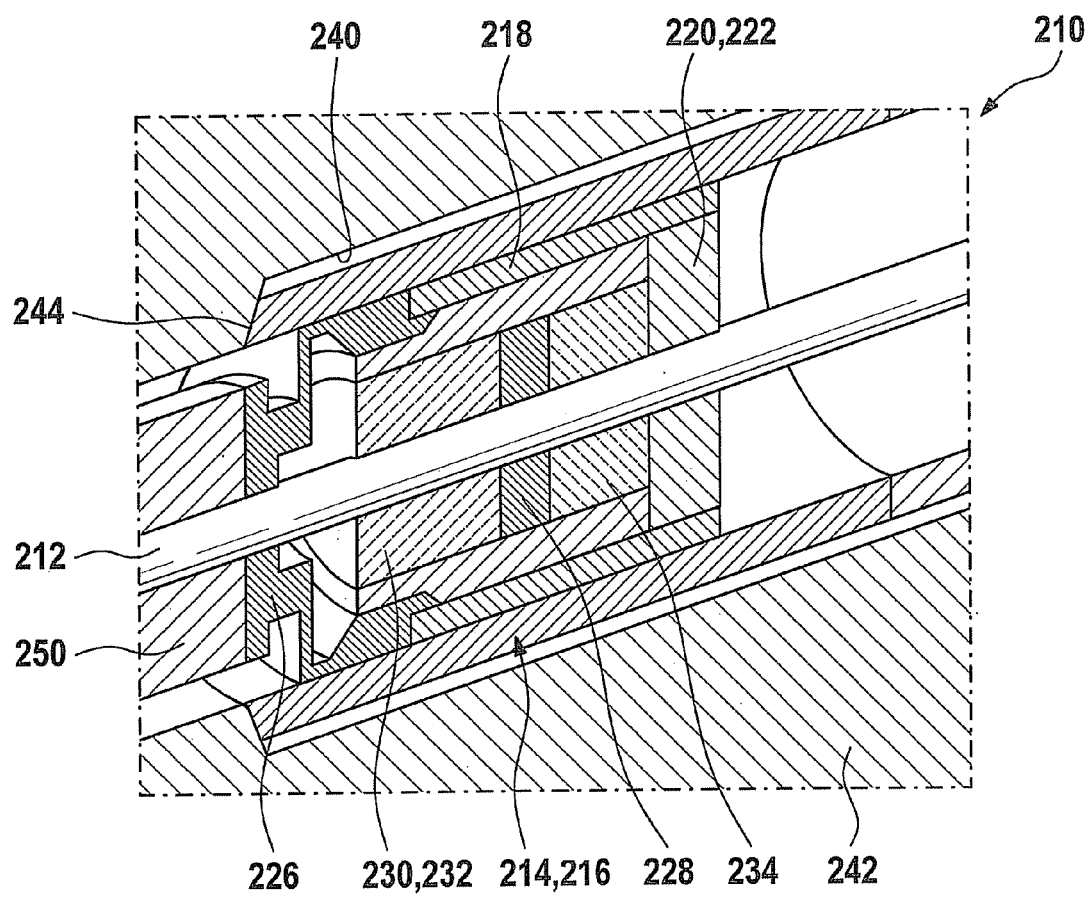

FIGS. 2 and 3 illustrate an exemplary embodiment of a combination sensor 210 according to the present invention. FIG. 2 shows a perspective sectional diagram of combination sensor 210, whereas FIG. 3 shows the detail labeled as A in FIG. 2 on an enlarged scale. A basic idea of the exemplary embodiment shown here is to perform a combined measurement of the combustion chamber pressure and the combustion chamber temperature. Based on the conventional combustion chamber pressure sensors described above, for example, it has been recognized that when a glow function is not needed with the known sensor elements for gasoline engines, for example, additional sensor functions may be integrated instead of the glow body, for example, a temperature sensor (e.g., a thermocouple), an ionic current sensor or a gas sensor. At least one temperature sensor 212 is integrated within the scope of the present invention.

In the exemplary embodiment shown here, combination sensor 210 has, in addition to temperature sensor 212, a combustion chamber pressure sensor 214, which includes a pressure sensor module 216 having a module housing 218, for example, a thin-walled steel sleeve. On its end facing away from combustion chamber 224, this module housing 218 is closed by a steel plate 220, which also functions as a counterbearing 222. On its end facing combustion chamber 224, module housing 218 is sealed by a diaphragm 226, for example, a steel diaphragm. A mechanical-electrical converter 228 is accommodated in module housing 218. This may be, for example, a piezoelectric element and/or a quartz element having electrodes for converting a signal from a force signal into a charge signal. On the side facing combustion chamber 224, an insulating body 230, for example, a ceramic insulating body, is connected to mechanical-electrical converter 228. This insulating body at the same time functions as a force-transmitting element 232 or as part of such a force-transmitting element 232. On the opposite side of mechanical-electrical converter 228, between counterbearing 222 and mechanical-electrical converter 228, another insulating body 234 may be provided, for example, in the form of another ceramic insulating body.

Thermocouple 212 is guided through combustion chamber pressure sensor 214, so that on the whole, an axially symmetrical coaxial configuration is formed in this exemplary embodiment. Temperature sensor 212 protrudes beyond pressure sensor module 216 on the side facing away from combustion chamber 224 as well as on the side facing combustion chamber 224. In this way, a terminal contact 236 is formed on the side facing away from combustion chamber 224, and temperature sensor 212 optionally protrudes into combustion chamber 224 on the side facing combustion chamber 224. Temperature sensor 212 may be integrally joined to the diaphragm at its feedthrough in diaphragm 226, for example, being welded to the steel diaphragm. Combination sensor 210 may also have an external sensor housing 238. Module housing 218 may be introduced, for example, into external sensor housing 238 and may optionally be connected to it, for example, in turn by a force-fit and/or form-fit and/or integrally joined connection. Diaphragm 226 may in particular be integrally joined to module housing 280, for example, by welding.

Combination sensor 210 may be accommodated in a borehole 240 in a wall 242 of combustion chamber 224, for example, in a cylinder head. The borehole may have a stepped design in particular, as shown in FIG. 2, and combination sensor 210 may also have a stepped design having at least one sealing shoulder 244. At least one sealing site 246 may be provided on this sealing shoulder 244 and/or at other points between combination sensor 210 and wall 242, for example, a sealing site between external sensor housing 238 and a cylinder head. External sensor housing 238 may have, for example, an integral thread 248 for a screw connection in wall 242. Sealing shoulder 244 may be pressed against wall 242 with the aid of this thread and/or some other means of attachment to thereby achieve the sealing effect. External sensor housing 238 may completely or partially encircle combination sensor 210. In the exemplary embodiment shown here, only a partial encirclement is provided. In the area between pressure sensor module 216 and combustion chamber 224, a guide 250 is additionally provided within which temperature sensor 212 is guided. Guide 250 may include a hollow cylinder made of steel, for example. Guide 250 may also optionally be part of force-transmitting element 232 to transfer the pressure in combustion chamber 224 to diaphragm 226. However, a design in which diaphragm 226 is directly exposed to the pressure in combustion chamber 224 is also alternatively possible. Temperature sensor 212 may include, for example, a jacketed thermocouple. Various other embodiments are also possible. Pressure sensor module 216 in FIGS. 2 and 3 forms a cylindrical force measuring cell having a straight lead-through of temperature sensor 212, for example, of the jacketed thermocouple. Alternatively, instead of a cylindrical force measuring element, a rod-shaped or cube-shaped force measuring element may also be used as mechanical-electrical converter 228. Temperature sensor 212 is then preferably guided laterally past this force measuring element or converter 228. However, the force path from diaphragm 226 to converter 228 should not be disturbed due to friction, for example. Combination sensor 210 shown in FIGS. 2 and 3 may also have additional functions in addition to the two aforementioned sensor functions of detecting a combustion chamber pressure and a combustion chamber temperature. For use in diesel engines, for example, at least one glow body function may also be provided in this exemplary embodiment as well as in other exemplary embodiments of combination sensors 210 according to the present invention. It is thus particularly advantageous for use in diesel engines, for example, to integrate both glow plug bodies and thermocouples into the combustion chamber pressure sensor and to guide the feeder lines for both additional functions in the interior of a cylindrical force measuring element, for example, a pressure sensor module 216 and/or a mechanical-electrical converter 228.

What is claimed is:

1. A method for operating an internal combustion engine, comprising:
    detecting at least one combustion chamber pressure in an interior of a combustion chamber of the internal combustion engine;
    detecting at least one local combustion chamber temperature in the interior of the combustion chamber;
    inferring a composition of a gas mixture in the combustion chamber based on the combustion chamber pressure and the combustion chamber temperature; and
    regulating the operation of the internal combustion engine using the composition as a regulating variable,
    wherein the step of regulating the operation of the internal combustion engine comprises one or more of the following steps:
        regulating a start of combustion, regulating a location of combustion, regulating a rate of exhaust gas recirculation, reducing nitrogen oxide emission, reducing exhaust peak temperature, regulating injection time, and regulating injection quantity.

2. The method as recited in claim 1, wherein the combustion chamber pressure and the combustion chamber temperature are detected essentially simultaneously.

3. The method as recited in claim 1, wherein the combustion chamber pressure and the combustion chamber temperature are detected in a compression phase of the internal combustion engine.

4. The method as recited in claim 1, wherein the composition is a mass-based ratio of combusted air and fresh air.

5. The method as recited in claim 4, wherein the internal combustion engine is regulated by using the mass-based ratio.

6. The method as recited in claim 1, wherein an isentropic coefficient κ of the gas mixture is determined from the combustion chamber pressure.

7. The method as recited in claim 6, wherein the composition is inferred from a known relationship between the isentropic coefficient, the combustion chamber pressure and the combustion chamber temperature.

8. The method as recited in claim 1, further comprising:
    determining at least one air ratio and a humidity of intake air of the internal combustion engine.

9. The method as recited in claim 8, further comprising:
    operating the internal combustion engine with exhaust gas recirculation, an exhaust gas recirculation rate being inferred from the composition and the air ratio plus the humidity.

10. The method as recited in claim 1, further comprising:
    determining at least one air ratio of intake air of the internal combustion engine.

11. The method as recited in claim 10, further comprising:
    operating the internal combustion engine with exhaust gas recirculation, an exhaust gas recirculation rate being inferred from the composition and the air ratio.

* * * * *